(12) United States Patent
Anderson

(10) Patent No.: US 6,178,901 B1
(45) Date of Patent: Jan. 30, 2001

(54) SEED BOOT AND SEED POSITIONER

(76) Inventor: Kevin M. Anderson, R.R. 2 Box 9, Andover, SD (US) 57422

( * ) Notice: Under 35 U.S.C. 154(b), the term of this patent shall be extended for 0 days.

(21) Appl. No.: 09/313,551

(22) Filed: May 14, 1999

Related U.S. Application Data

(63) Continuation-in-part of application No. 29/094,582, filed on Oct. 5, 1998, and a continuation-in-part of application No. 29/096,567, filed on Nov. 16, 1998.

(51) Int. Cl.[7] .................................................. A01C 5/00
(52) U.S. Cl. .......................... 111/197; 111/152; 111/150; 111/170
(58) Field of Search .................... 111/149, 150, 111/152, 153, 154, 156, 162, 161, 170, 176, 189, 190, 197, 200

(56) References Cited

U.S. PATENT DOCUMENTS

| | | |
|---|---|---|
| 3,122,111 | 2/1964 | Taylor, Sr. . |
| 4,446,801 * | 5/1984 | Machnee et al. ...................... 111/86 |
| 4,798,151 * | 1/1989 | Rodrigues, Jr. et al. ............... 111/73 |
| 4,911,090 * | 3/1990 | Schimke ................................. 111/150 |
| 5,025,736 | 6/1991 | Anderson . |
| 5,092,255 | 3/1992 | Long et al. . |
| 5,325,799 * | 7/1994 | Rowlett .................................. 111/152 |
| 5,425,318 | 6/1995 | Keeton . |
| 5,481,990 * | 1/1996 | Zacharias ............................... 111/174 |
| 5,562,055 * | 10/1996 | Petersen ................................. 111/195 |
| 5,640,915 | 6/1997 | Schaffert . |
| 5,673,638 * | 10/1997 | Keeton ................................... 111/167 |
| 5,918,557 * | 7/1999 | Schaffert ................................ 111/150 |

* cited by examiner

Primary Examiner—Victor Batson
(74) Attorney, Agent, or Firm—Burd, Bartz & Gutenkauf

(57) ABSTRACT

A furrow opener of an air seed planter is equipped with a seed boot and seed positioner for planting one or more rows of seeds in soil. The seed boot has walls providing a passage for directing seeds into a furrow. The seed positioner attached to the seed boot channels seeds in one or more rows of seeds and covers the seeds with a substantially uniform layer of soil. The forward ground speed of the air seed planter and the velocity of the seeds carried by the flowing air reduce seed bounce due to the reverse drop of the seed boot.

25 Claims, 7 Drawing Sheets

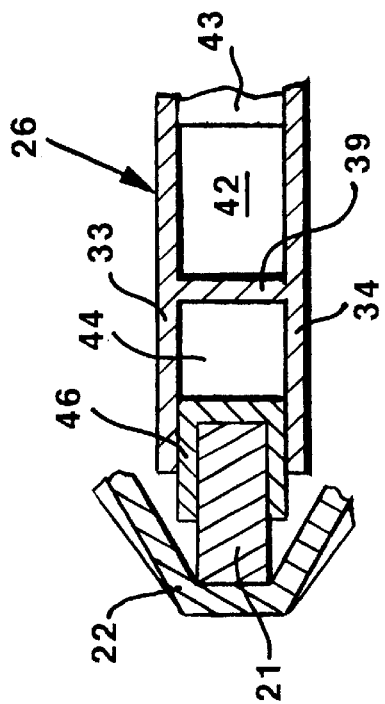
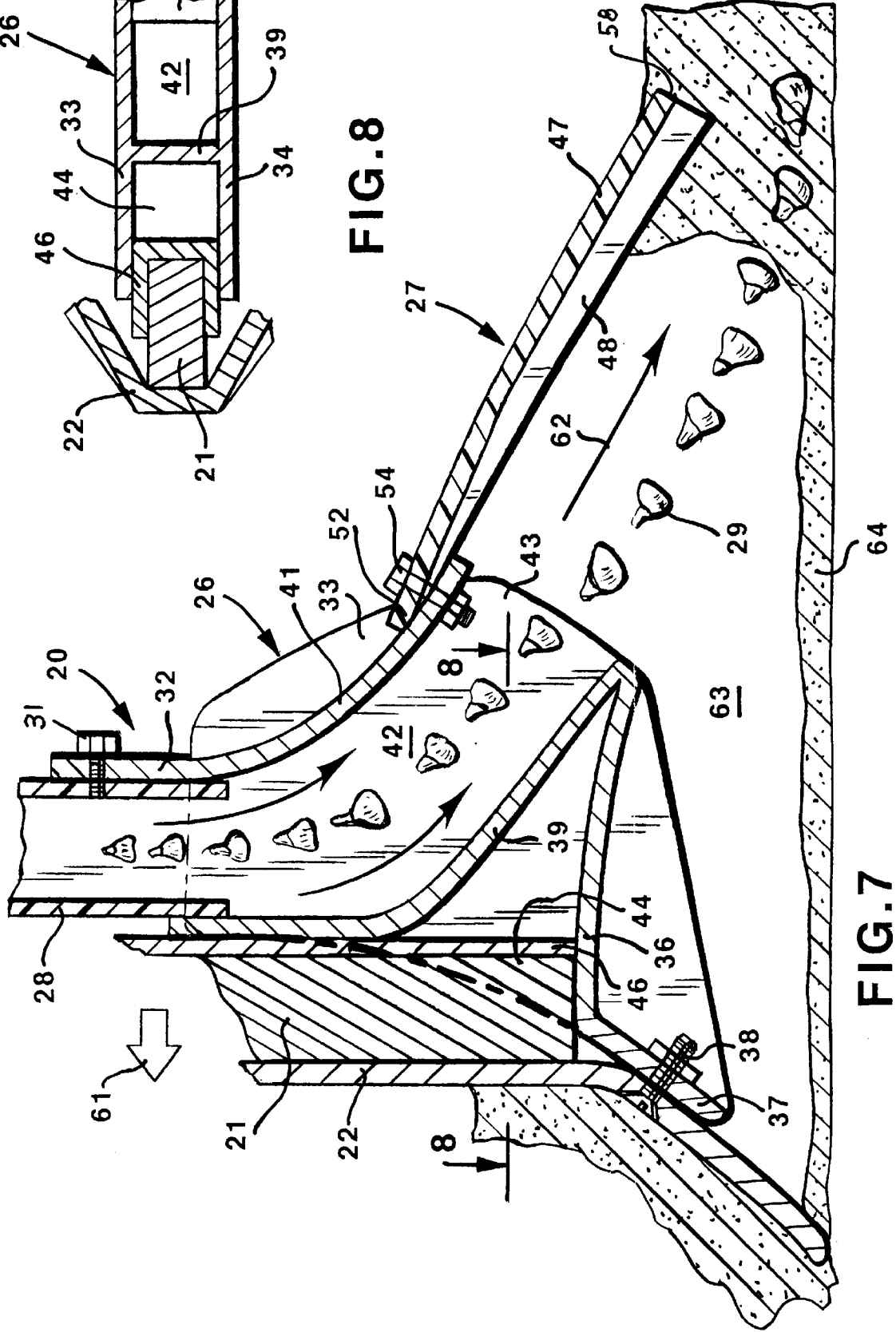
FIG. 8
FIG. 7

FIG.13
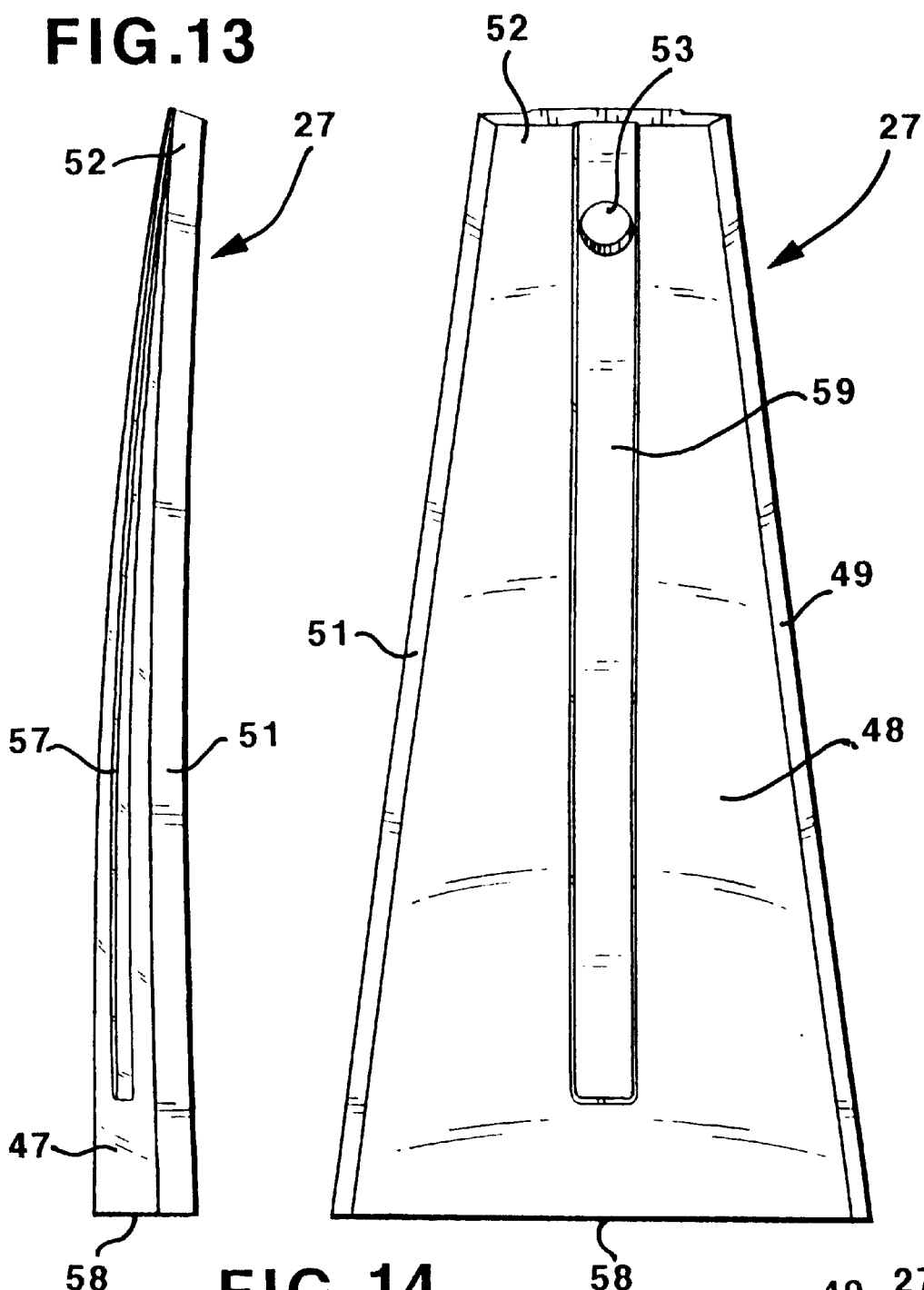
FIG.14
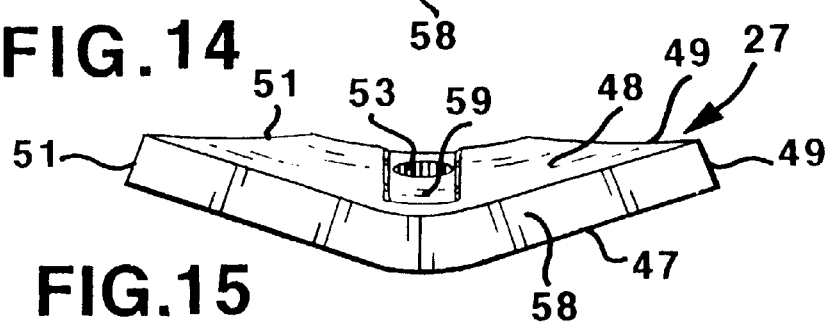
FIG.15

SEED BOOT AND SEED POSITIONER

This applicaiton is a Continuation-in-Part of application No. 29/094,582 filed Oct. 5, 1998 which is a Continuation-in-Part of application No. 29/096,567 filed Nov. 16, 1998.

TECHNICAL FIELD

The field of the invention is earth working implements. The implement is an agricultural earth working tool for planting seeds in one or more rows in soil and packing the soil around the seeds.

BACKGROUND OF THE INVENTION

Air seed planters use flowing air to carry seeds to seed boots which direct the air and seeds into furrows in the soil. The planters are equipped with earthworking tools used to form the furrows. The seed boots mounted on the tools are connected to air seeding dispensers with tubes that transport air and seeds to the seed boots. Proper placement of seeds in the furrows is important to predicate uniform seed germination and crop emergence. The seeds should be deposited in the furrows at a substantially uniform depth and covered with an even layer of soil. Seed bounce and soil flow into the furrows must be substantially reduced to achieve uniform seed depth. Conventional furrow openers used to place seeds in the soil do not effectively control seed bounce. The seeds are directed by flowing air and the seed boot in the direction of travel of the implement which causes the seeds to bounce in the furrow. The soil must be firmed about the seeds to reduce loose soil and air pockets so as to maintain suitable moisture content of the soil which promotes plant growth.

A furrow opener for placing fertilizer and seeds at different depths in the soil is disclosed K. M. Anderson in U.S. Pat. No. 5,025,736. This furrow opener has a soil press plate that covers a band of fertilizer and forms a firm seed bed above the fertilizer. A seed dispenser divides the seed carried by air and deposits the seed in separate parallel rows. The seed dispenser does not compensate for seed bounce. A packer wheel located behind the furrow opener compresses the soil in firm contact with the seeds and fertilizer. J. D. Long and R. W. Hook in U.S. Pat. No. 5,092,255 have designed a strap for a seed boot to reduce seed bounce. The strap is an ultra-high molecular polyethylene sheet having a flat transverse section with a continuous width of about the width of the furrow. During use the strap bends rearwardly into an arcuate shape and contacts seeds which are pressed into the soil in the bottom of the furrow. Soil firming and closing wheels behind the strap crush the soil sides of the furrow to place a loose layer of soil over the seeds. E. G. Keeton in U.S. Pat. No. 5,425,318 discloses a resilient seed firming attachment fastened to a seed boot to reduce seed bounce and direct seeds to the bottom of a furrow. This attachment has a hockey stick blade shape with a flexible portion to ensure that sufficient force is applied to the seed to firm the seed into the soil at a desired planting depth. P. E. Schaffert in U.S. Pat. No. 5,640,915 discloses several elongated flexible members that can be attached to furrow openers to assist in placing seeds in furrows and directs bouncing seeds into the bottom of the furrows. The members have lower segments that extend into the furrows. The lower segments have opposite side edges that converge to trailing ends which are spaced above the bottoms of the furrows. The members do not change the profiles of the furrows as they do not engage the soil.

SUMMARY OF THE INVENTION

The invention is a seed boot and seed positioner for depositing one or more rows of seeds, such as corn, soybeans, peas and small grains, in a furrow in soil and covering the seeds with a uniform layer of soil. Air seed planters have furrow openers for making furrows in seed bed soil for one or more rows of seeds. The seed boot is attached to the furrow opener to receive seeds from a tube connected to the seed dispenser of the planter and direct the seeds into the furrow behind the furrow opener. The seed positioner connected to the seed boot and extended rearwardly and downwardly into the furrow controls seed bounce and maintains linear row alignment of the seeds. Seed positioner has a transverse broad V-shape and an increasing width toward the trailing end of the positioner. The seed positioner has a width sufficient to gather soil from opposite sides of the furrow and cover and firm soil about the seeds. The seed positioner can be attached to the seed boot in an inverted position so it divides the seeds into separate linear rows and covers each row of seeds with a generally uniform layer of soil.

The preferred embodiment of the seed boot and seed positioner mounted on an upright shank of furrow opening tool of an air seed planter directs seeds into the furrow in one or more linear aligned rows and covers the seeds with a substantially uniform layer of soil. The seed boot has laterally spaced side members joined with transverse top, bottom and middle walls. The top and middle walls curve downwardly and rearwardly and are spaced from each other providing a passage for accommodating air and seeds. The upper end of the passage is in communication with a tube connected to the seed dispenser of the planter whereby seeds are directed into the passage. The seeds are discharged rearwardly from the seed boot into the furrow. The rearward discharge or drop of the seeds and the velocity of the seeds moving with the air flowing out of the seed boot reduces seed bounce. Lateral movements and bouncing of seeds flowing with air from the seed boot is controlled with the seed positioner. The seed positioner channels the seeds into one or more linear rows and covers the seeds with a substantially uniform layer of soil. The seed positioner is mounted on the seed boot in one of two positions. The first position of the seed positioner channels the seeds into a single linear row of seeds. The second position of the seed positioner divides the seeds into two generally parallel linear rows of seeds. The seed positioner has a one piece member with a first and a second end opposite the first end. The second end has a transverse linear edge having a transverse width about twice the transverse width of the first end and greater than the width of furrow. Opposite sides of the member diverge rearwardly between the first and second ends of the member. The member has a longitudinal center section joined to longitudinal side sections. The side sections are located in intersecting planes to angularly locate the side sections relative to each other. The member has a longitudinal curvature extended between its first and second ends. When the side sections of the member diverge downwardly the seeds are channeled into a single linear row of seeds and covered with a substantially uniform layer of soil. The member also firms the soil about the seeds. Inverting the member locates the side sections in diverging upward relationship whereby the side sections divert seed into two separate rows of seeds and covers the seeds with soil.

The objects, features, and thedvantages of the seed boot and seed positioner of the invention are embodied in the following detailed description and drawings of a presently preferred embodiment of the invention.

DESCRIPTION OF THE DRAWINGS

FIG. 7 is an enlarged sectional view taken along the line 7—7 of FIG. 4;

FIG. 8 is a sectional view taken along the line 8—8 of FIG. 7;

FIG. 13 is a side elevational view of the seed positioner of FIG. 11;

FIG. 14 is a bottom plan view of the seed positioner of FIG. 1;

FIG. 15 is an end elevational view of the trailing end of the seed positioner of FIG. 1;

DESCRIPTION OF PREFERRED EMBODIMENTS

Figure 1:
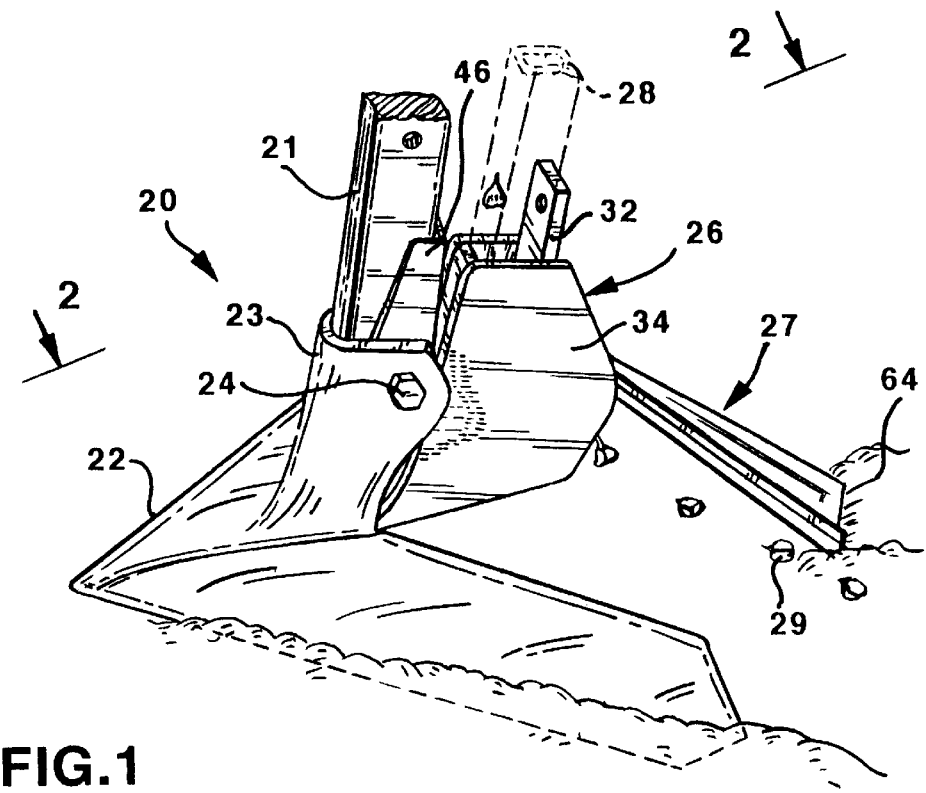
FIG. 1 is a perspective view of a furrow opener, seed boot, and seed positioner of the invention attached to a shank of an air row crop seed planter.
Figure 2:
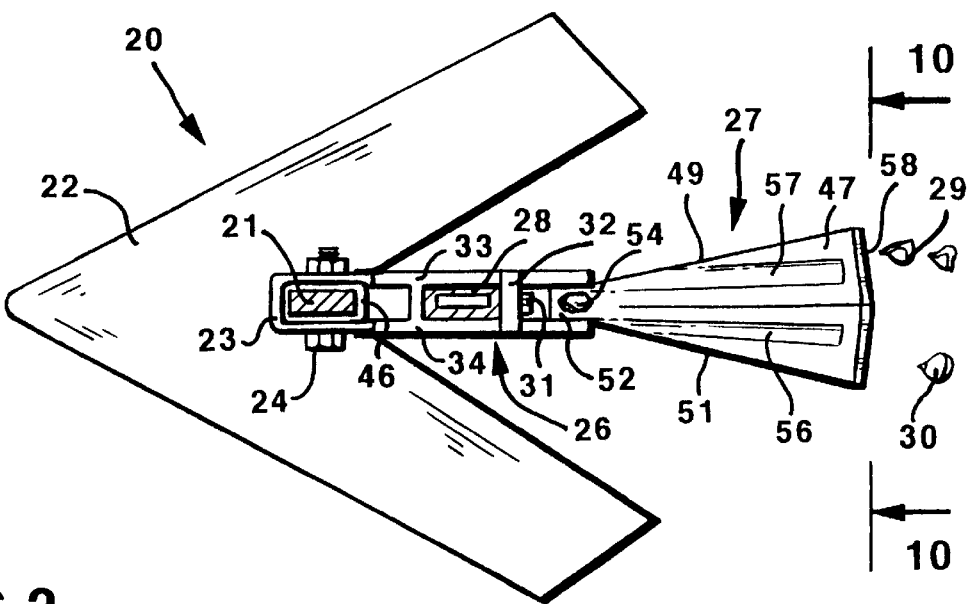
FIG. 2 is a sectional view taken along the line 2—2 of FIG. 1.
Figure 3:
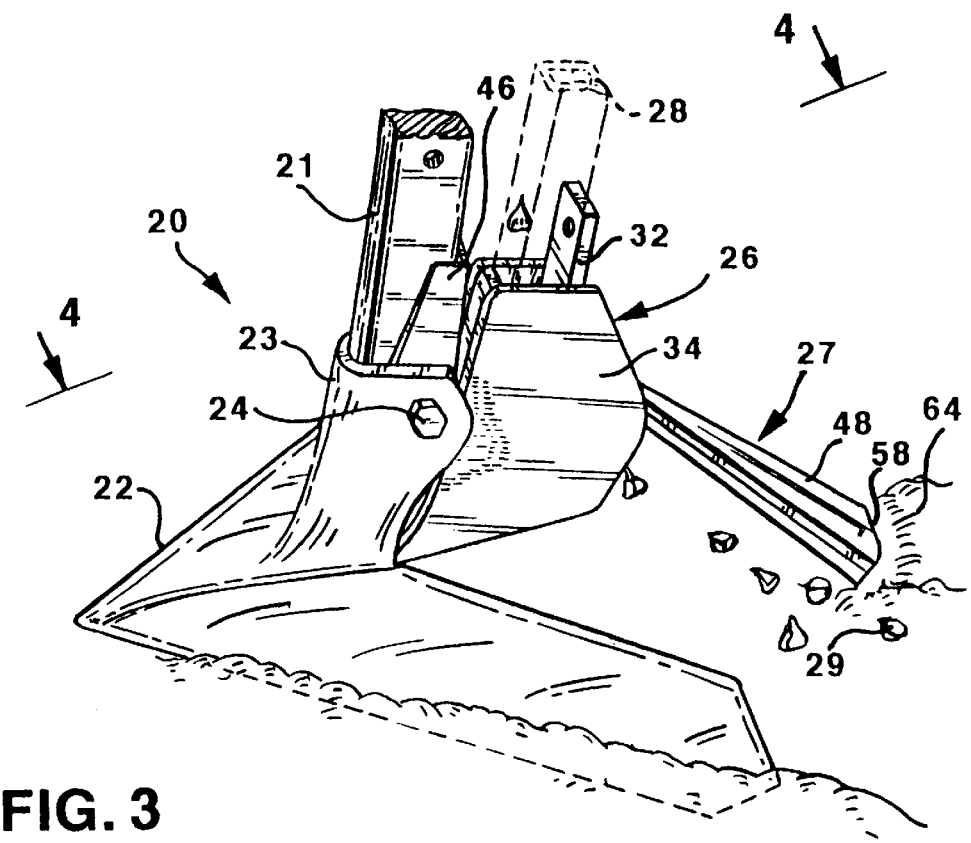
FIG. 3 is a perspective view of a modification of the furrow opener, seed boot, and seed positioner of FIG. 1.
Figure 10:
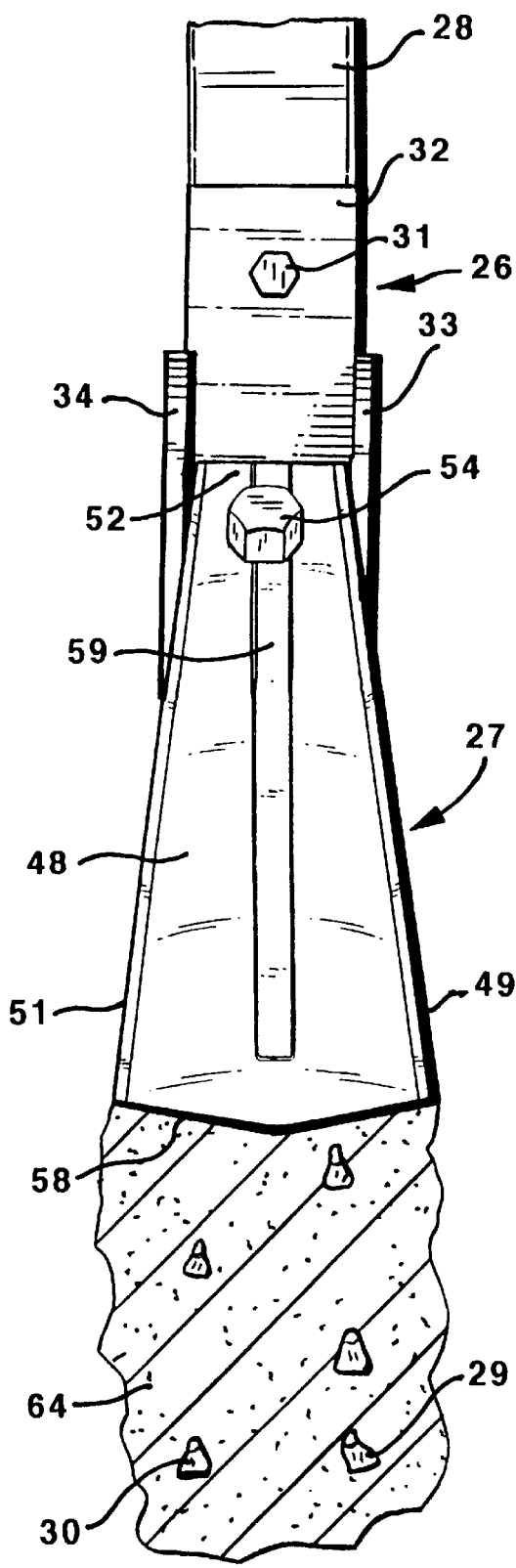
FIG. 10 is an enlarged sectional view taken along the line 10—10 of FIG. 2.
Figure 12:
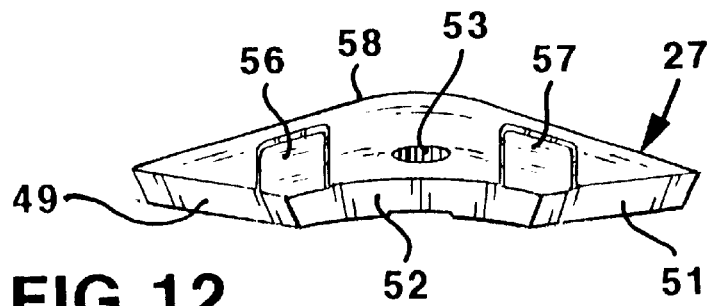
FIG. 12 is an end elevational view of the forward end of the seed positioner of FIG. 11.
Figure 11:
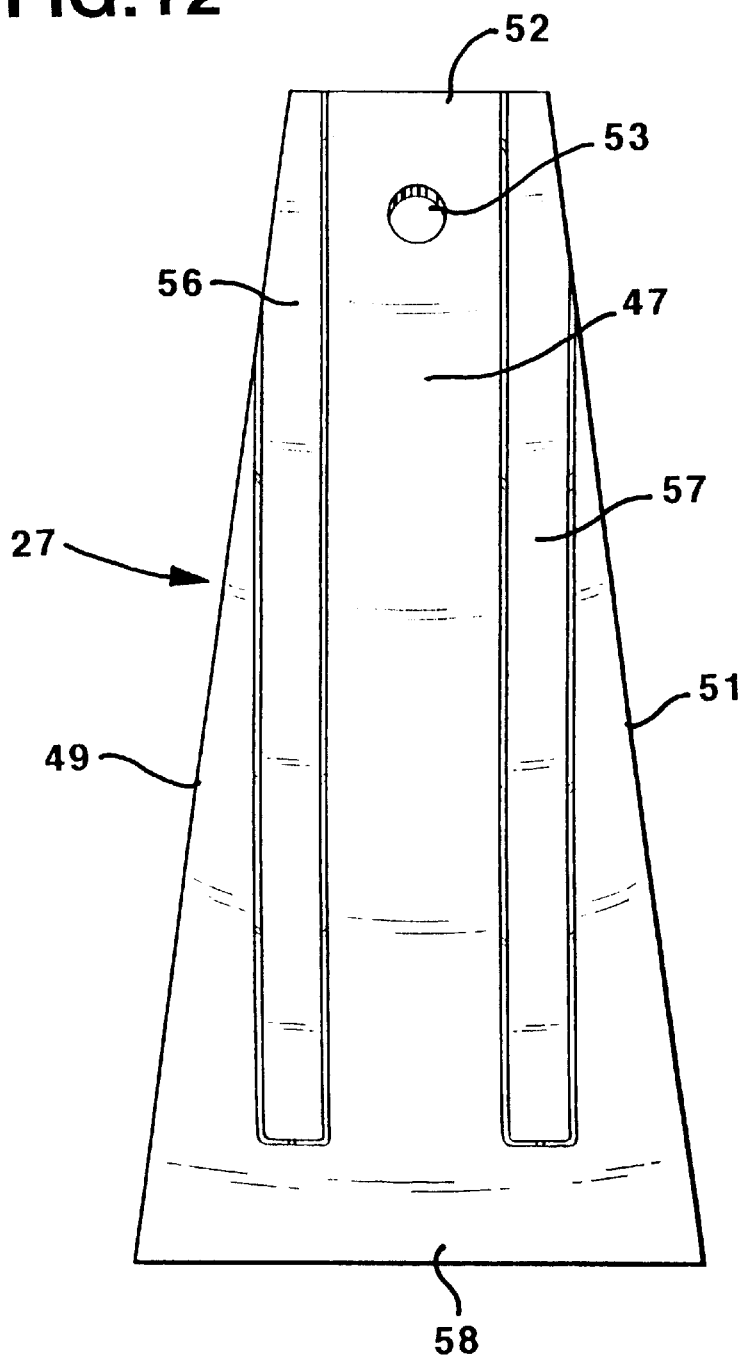
FIG. 11 is a top plan view of the seed positioner of FIG. 1.

Referring to FIGS. 1 and 2, there is shown an earth working tool 20 mounted on an upright standard or shank 21 for making an elongated furrow 63 in soil 64 for seeds 29. Tool 20 has a sweep tooth 22 having rearward diverging blades and an upwardly extended U-shaped neck 23 located around the front and sides of shank 21. A transverse nut and bolt assembly 24 attaches neck 23 to shank 21. Different types of teeth, such a spade-shaped tooth, can be attached to shank 21 to open a furrow 63 in soil 64. Shank 21 is part of an air seed planter having a plurality of shanks attached to earth working teeth for making parallel furrows in the soil for seeds. The air seed planter has a tube or hose 28 which transports air and seeds to a seed boot 26 attached to shank 21 behind tooth 22. A seed positioner 27 secured to boot 26 firms or packs soil 64 about seeds 29 and 30 to provide a firm seed bed for seeds 29 and 30. Positioner 27 channels or guides seeds 29 and 30 into parallel rows of seeds, as seen in FIG. 10.

Seed boot 26 has flat side members 33 and 34 joined to an upright tab 32 and a bottom member 36. A bolt 31 attaches tube 28 to tab 32. As shown in FIG. 7, bottom member 36 has a downward and forwardly directed extension 37. A bolt 38 secures earth working sweep 22 to extension 37. The bottom of shank 21 bears against bottom member 36 to reduce shear forces on bolts 24 and 38. A middle wall 39 located above bottom member 36 curves downwardly and rearward at an angle of about 45° relative to a horizontal plane. Tab 32 extended downward between side members 34 and 36 merges with a curved top wall 41 which is spaced from middle wall 39 to form rearwardly and downwardly turned passage 42 for directing air and seeds 29 in a rearward and downward direction into furrow 63 in soil 64. Seeds 29 move out of open end 43 of passage 42 rearwardly as shown by arrow 62 opposite the direction of movement of tool 20 relative to the ground. The velocity of the movement of seeds 29 relative to soil 64 is reduced by directing seed movement in the direction opposite the movement of tool 20 to reduce seed rebound or bounce as they are deposited in soil 64. The rearward discharge of seeds 29 into furrow 63 and the velocity of the seeds moving with the air flowing out of seed boot 26 predicates reduced seed bounce in furrow 63.

A member 46 attached to the front of wall 39 and side members 33 and 34 provides a pocket 44 accommodating the lower end of shank 21. As shown in FIG. 8, member 46 extends adjacent opposite sides of shank 21 to prevent lateral movement and twisting of boot 26 relative to shank 21.

Figure 4:
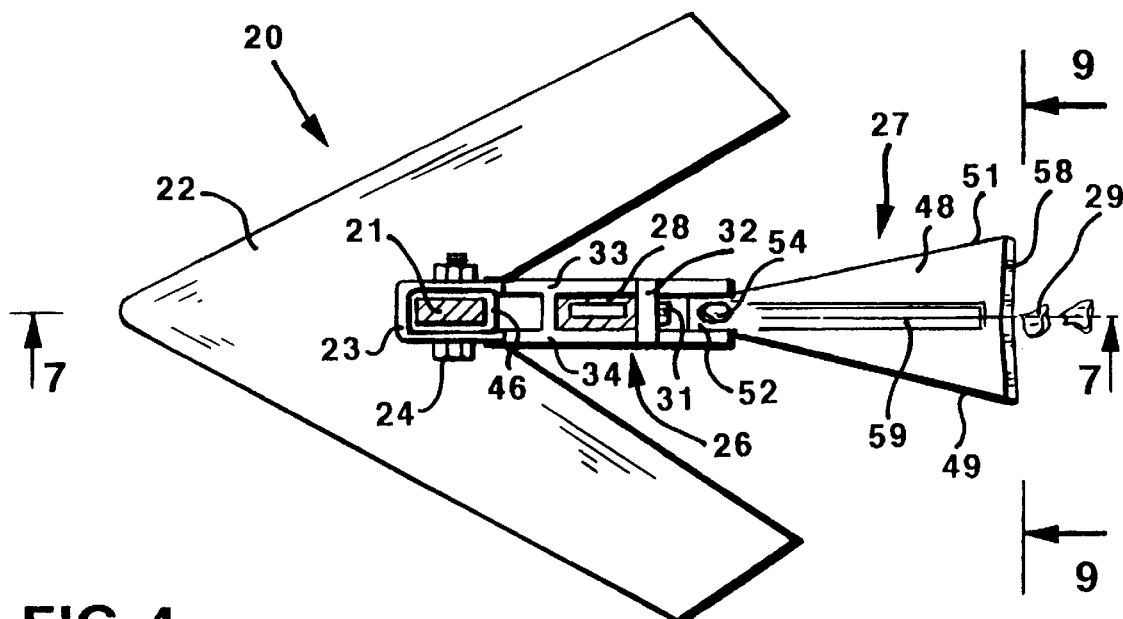
FIG. 4 is a sectional view taken along line 4—4 of FIG. 3.
Figure 5:
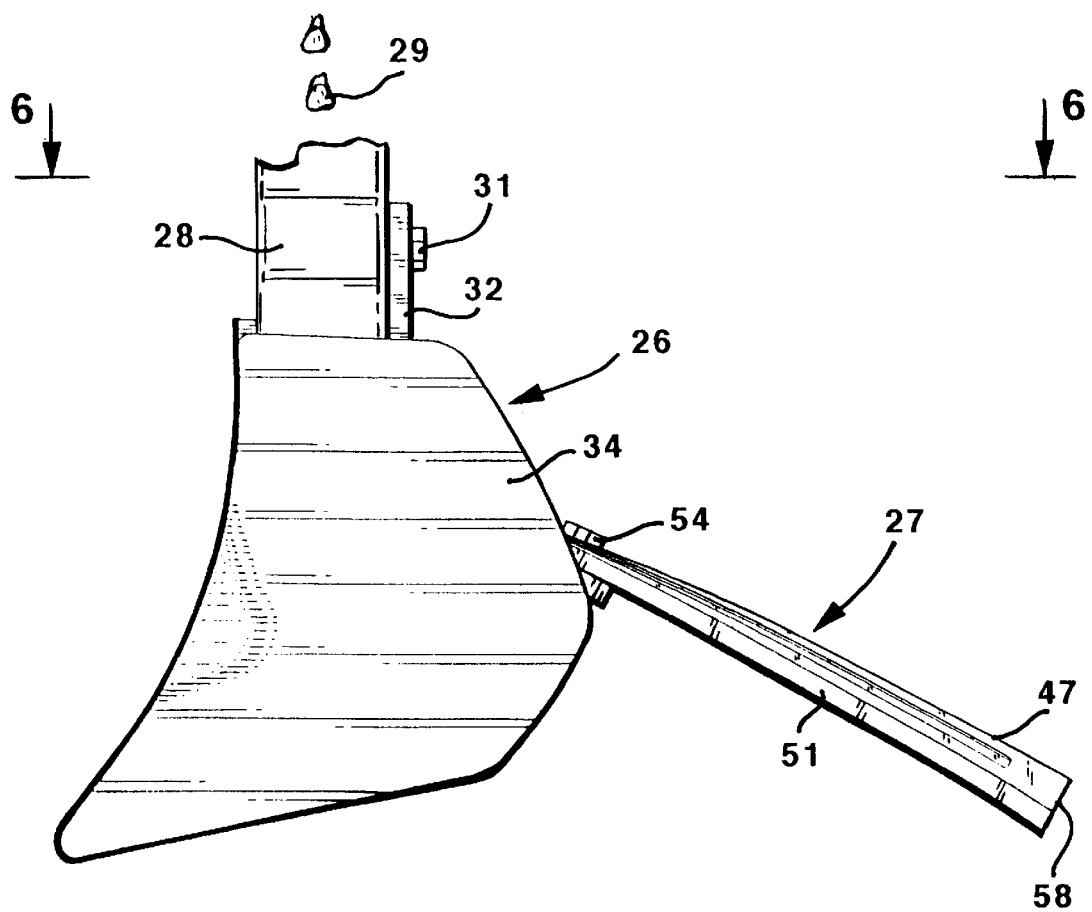
FIG. 5 is a side elevational view of the seed boot and seed positioner of FIG. 1.
Figure 6:
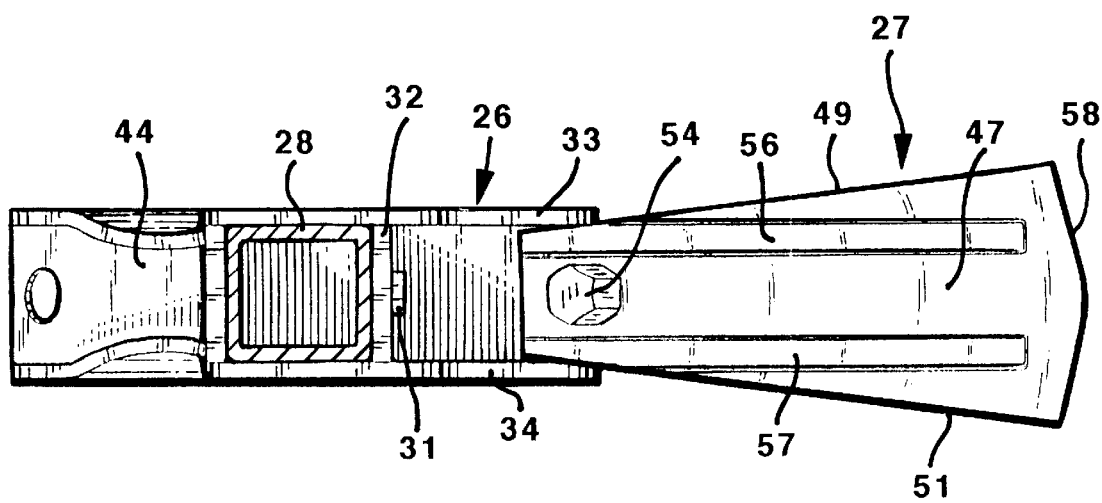
FIG. 6 is a sectional view taken along line 6—6 of FIG. 5.

Positioner 27 is a one piece plastic member, such as ultra high molecular weight polyethylene, having a top surface 47 and a bottom surface 48. Opposite side edges 49 and 51 of positioner 27 are linear and taper rearwardly from a front end 52 to a trailing end 58. End 52 has a hole 53 accommodating a bolt 54. Bolt 54 secures positioner 27 to wall 41. As seen in FIGS. 1, 4 and 6, end 52 is located between and engages side members 33 and 34 to prevent lateral movement and twisting of positioner 27 on boot 26. Bolt 54 holds and 52 against wall 41 and retains positioner's downward and rearward orientation relative to boot 26.

As shown in FIGS. 12 to 15, positioner 27 has a pair of linear grooves 56 and 57 in top surface 47 on opposite sides of the longitudinal center line of positioner 27. Grooves 56 and 57 extend from front end 52 toward trailing end 58. As seen in FIGS. 14 and 15, bottom surface 48 has a single central groove 59 extended from end 52 along the center longitudinal axis of positioner 27. Positioner 27 has a transverse broad V or bow shape with opposite linear side portions angularly located relative to each other. As shown in FIG. 13, positioner 27 has a continuous broad longitudinal curve from end 52 to end 58.

An example of positioner 27 is a one piece ultra high molecular weight polyethylene member having a thickness of ¼ inch and a longitudinal length of 6 inches. End 52 has a transverse width of 1½ inches and trailing end has a transverse width of 3 inches. Opposite edges 49 and 51 are linear and extend between the outside edges of ends 52 and 58. The linear side sections of the member on opposite sides of the center line are angularly orientated relative to each other. The transverse angle between the linear sections progressively decreases from end 52 to trailing end 58. For example, the transverse angle between the top surface of linear section at end 52 is 160 degrees and the transverse angle between the top surfaces of the linear sections at trailing end is 150 degrees. Other angular relationships between the linear sections of positioner 27 can be used to control the positions of seeds 29 and 30 placed in soil 64. The radius of longitudinal curvature of positioner 27 is 20 inches. Other curves can be used for the longitudinal shape of positioner 27.

As shown in FIGS. 2, 5, 6, 7 and 9, seed positioner 27 secured to seed boot 26 with bolt 54 extends downwardly and rearwardly from boot 26 with the trailing end 58 located in soil 64. Positioner 27 extends at an angle of 30 degrees relative to a horizontal plane of the soil. The trailing edge 58 of positioner 27, as shown in FIG. 7, is above the forward tip of sweeps 22 and the bottom of furrow 63. The location of trailing edge 58 of positioner 27 relative to the bottom of furrow 63 controls the depth of the layer of soil above seeds 29. The side sections of positioner 27 diverge downwardly so that when tool 20 is moved forward, soil is gathered from opposite sides of furrow 63 and merged or moved together. The merging soil maintains seeds 29 in a single row of seeds and covers the seeds with a substantially uniform layer of soil. The downward diverging side sections of positioner 27 also assist in maintaining the longitudinal alignment of seeds 29. Positioner 27 compresses or firms the soil around seeds 29 during forward movement of tool 20 when the trailing end 58 is located in soil 64.

Returning to FIGS. 1, 2 and 10, seed and soil positioner 27 attached to boot 26 with bolt 54 causes seeds 29 and 30 to be placed in two rows in the soil 64. The side sections of positioner 27 diverge upwardly so that when tool 20 is moved forward, soil is pushed in opposite lateral directions locating seeds 29 and 30 in separate rows. Positioner 27 also firms and presses the soil into contact with the seeds and eliminates air pockets in the soil.

Figure 9:
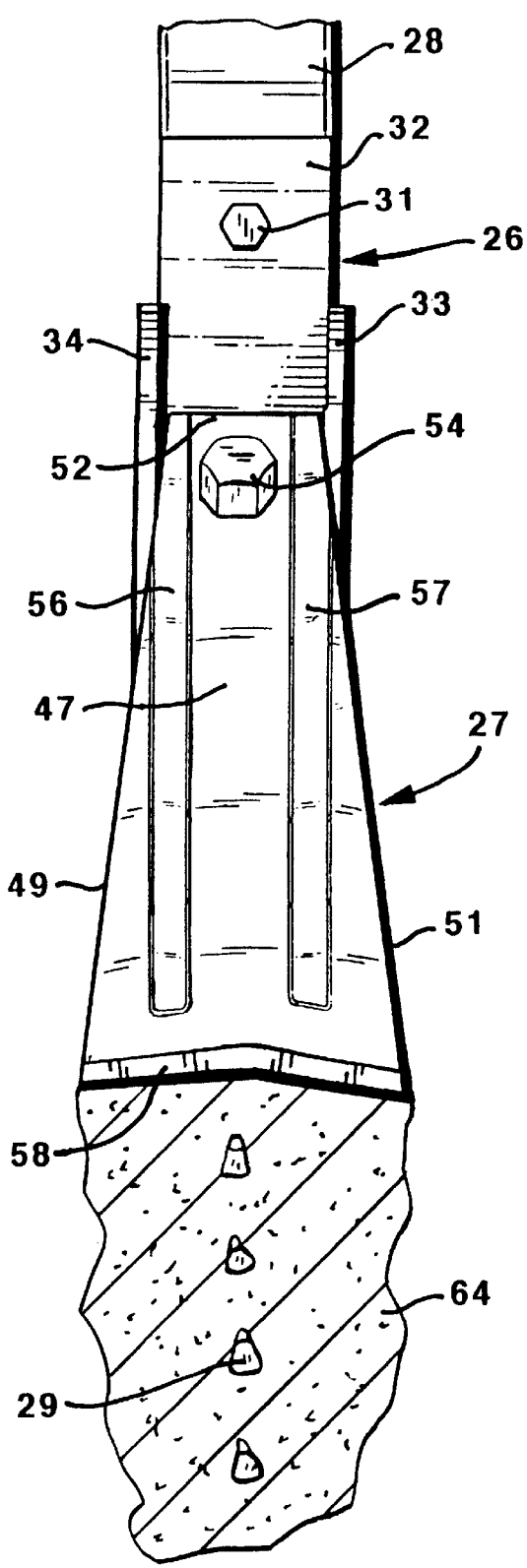
FIG. 9 is an enlarged sectional view taken along the line 9—9 of FIG. 4.

In use seed positioner 27, as shown in FIGS. 9 and 10, can be mounted on seed boot 26 with bolt 54 in two positions. Positioner 27 in FIG. 9 is in an inverted V-shaped position which channels seeds 26 in a single linear row of seeds. Soil is collected from the furrow sides with the side sections and firmed about seeds 29. When positioner 27 is turned 180 degrees, as shown in FIG. 10, the side sections of positioner 27 are in V-shaped orientation. Seeds 29 and 30 are divided into separate linear rows of seeds. The side sections gather soil from the furrow sides and firm and cover the seeds with soil.

When the planter is moved along the seed bed, sweep 22 opens longitudinal furrow 63 in soil 63. Seeds 29 flowing through passage 42 are introduced in furrow 63 behind seed boot 26. The seeds 29 located in an air stream flowing from the open end 43 of passage 42 have irregular and lateral movements and may bounce around in furrow 63. The amount of seed bounce is reduced by directing seeds 29 and 30 from seed boot 26 in a direction opposite the ground speed of the planter with rearward flowing air. Positioner 27 restricts movements and bouncing of seeds 29 and channels seeds 29 into a linear row of seeds 29 or a pair of rows of seeds 29 and 30. The middle and trailing portions of positioner 27 being wider than the furrow 63 gather soil from opposite sides of the furrow and merge the soil above the seeds 29. The trailing end 58 of positoner 27 being below the surface of the soil firms the soil about seeds 27 and ensures a substantially uniform layer of soil above the row of seeds 29.

The invention has been described with reference to the drawings. It is intended that changes in the structures, arrangement of the structures, and materials of the structures can be made by one skilled in the art without departing from the invention. The invention is defined in the following claims.

What is claimed is:

1. A seed boot and seed positioner attachable to a furrow opener of a seed planter for directing seeds into a furrow and covering the seeds with soil comprising: the seed boot having laterally spaced side members, wall means laterally spaced and secured to the side members, said side members and wall means having a passage with an open inlet for receiving seeds and an open outlet end for directing the seeds into the furrow, said wall means having an extension for accommodating a fastener for securing the seed boot to a furrow opener; a positioner for placing seeds moving from the outlet end of the passage in the soil and covering said seeds with soil, means for connecting the positioner to the wall means whereby the positioner extends rearwardly from the boot, said positioner comprising a member having a first end, a second end opposite the first end, and opposite side edges extended between said first and second ends, said second end having a linear transverse edge, said transverse edge having a transverse width greater than a transverse width of the first end whereby said side edges diverged from the first end to the second end of the member, said member having a longitudinal center section and longitudinal side sections joined to the center section, said side sections being located in intersecting planes angularly located relative to each other whereby the side sections confine the seeds to at least one linear row of seeds and cover the seeds with soil.

2. The seed boot and seed positioner of claim 1 wherein: the wall means includes a top wall, a middle wall, and a bottom wall, said passage being located between said top and middle walls.

3. The seed boot and seed positioner of claim 1 wherein: the side members are flat plates laterally spaced from each other.

4. The seed boot and seed positioner of claim 1 wherein: said extension is located between and secured to the side members.

5. The seed boot and seed positioner of claim 4 wherein: the extension projects in a downward and forward direction.

6. The seed boot and seed positioner of claim 1 wherein: said side members and bottom wall have a pocket for accommodating a portion of a furrow opener for restraining movement of the seed boot relative to the furrow opener.

7. The seed boot and seed positioner of claim 1 wherein: the transverse width of the linear transverse edge of the positioner member is at least two times the transverse width of the first end thereof.

8. The seed boot and seed positioner of claim 1 wherein: the postitioner has a longitudinal arcuate curvature between the first and second ends thereof.

9. The seed boot and seed positioner of claim 1 wherein: the wall means includes a top wall and a middle wall, each wall having an upright top portion and a downwardly and rearwardly curved bottom portion, said passage being located between the top and middle walls whereby the seeds flow downwardly and rearwardly through said passage and into the furrow.

10. The seed boot and seed positioner of claim 1 wherein: the side sections of the positioner diverge downwardly and outwardly whereby the seeds are confined to a single linear row of seeds and are covered with soil.

11. The seed boot and seed positioner of claim 1 wherein: the side sections of the positioner diverge upwardly and outwardly whereby the seeds are directed into two linear rows of seeds and are covered with soil.

12. A seed boot attachable to a furrow opener of a seed planter for directing seeds into a furrow comprising: first and second side members, wall means located between and secured to the side members laterally spacing the side members from each other, said wall means having a top wall, a middle wall, and a bottom wall, said top and middle walls and side members having a passage with an open inlet end for receiving seeds and an open outlet end for transporting the seeds and directing the seeds into the furrow, said bottom wall having an extension adapted to be attached to a furrow opener, said side members and bottom wall have a pocket for accommodating a portion of a furrow opener for restraining movement of the seed boot relative to the furrow opener.

13. The seed boot of claim 12 wherein: the side members are flat plates laterally spaced from each other.

14. The seed boot of claim 12 wherein: said extension is located between and secured to the side members.

15. The seed boot of claim 14 wherein; the extension projects in a downward and forward direction.

16. A seed positioner for a tool for placing seeds in soil comprising:

an ultra high molecular weight plastic member having a transverse forward end, a transverse trailing end and linear opposite side edges extended between said ends, said trailing end having a linear transverse edge, said transverse edge having a transverse width greater than a transverse width of the forward end whereby said side edges diverge from the forward end to the trailing end of the member, said member having a longitudinal curvature from the forward end to the trailing end thereof and longitudinal side sections having a broad transverse V-shape configuration.

17. The seed positioner of claim 16 wherein: the transverse width of the transverse edge of the trailing end is at least two times the transverse width of the forward end of the member.

18. The seed positioner of claim 16 including: a hole on the member adjacent the forward end thereof.

19. The seed positioner of claim 16 wherein: the member has a longitudinal center section, said side sections being joined to the center section and extended laterally therefrom in intersecting planes that are angularly located relative to each other.

20. The seed positioner of claim 16 wherein: the width of the transverse edge of the trailing end of the member is about twice the width of the forward end of the member.

21. A seed positioner for a tool for placing seeds in soil comprising:

a member having a first end, a second end opposite the first end, and opposite side edges extended between said first and second ends, said second end having a linear transverse edge, said transverse edge having a transverse width greater than a transverse width of the first end whereby said side edges diverged from the first end to the second end of the member, said member having a longitudinal center section and longitudinal side sections joined to the center section, said side sections being located in intersecting planes angularly located relative to each other.

22. The seed positioner of claim 21 wherein: the transverse width of the linear transverse edge of the member is at least two times the transverse width of the first end thereof.

23. The seed positioner of claim 21 wherein: the member is a one piece ultra high molecular weight polyethylene member.

24. The seed positioner of claim 21 including: a hole in the center of the member adjacent the first end thereof.

25. The seed positioner of claim 21 wherein: the member has a longitudinal arcuate curvature between the first and second ends thereof.

* * * * *